US011219042B2

(12) United States Patent
Lin et al.

(10) Patent No.: US 11,219,042 B2
(45) Date of Patent: Jan. 4, 2022

(54) APPARATUS AND METHOD FOR PERFORMING VEHICLE TO EVERYTHING COMMUNICATION

(71) Applicant: GUANGDONG OPPO MOBILE TELECOMMUNICATIONS CORP., LTD., Dongguan (CN)

(72) Inventors: Huei-Ming Lin, Victoria (AU); Zhenshan Zhao, Dongguan (CN)

(73) Assignee: GUANGDONG OPPO MOBILE TELECOMMUNICATIONS CORP., LTD., Dongguang (CN)

( * ) Notice: Subject to any disclaimer, the term of this patent is extended or adjusted under 35 U.S.C. 154(b) by 0 days.

(21) Appl. No.: 16/991,931

(22) Filed: Aug. 12, 2020

(65) Prior Publication Data

US 2020/0374898 A1 Nov. 26, 2020

Related U.S. Application Data

(63) Continuation of application No. PCT/CN2019/074869, filed on Feb. 12, 2019.

(Continued)

(51) Int. Cl.

*H04W 72/12* (2009.01)
*H04W 76/14* (2018.01)
*H04W 4/40* (2018.01)

(52) U.S. Cl.

CPC ......... *H04W 72/1236* (2013.01); *H04W 4/40* (2018.02); *H04W 72/1242* (2013.01); *H04W 76/14* (2018.02)

(58) Field of Classification Search

CPC ......... H04W 72/1236; H04W 72/1242; H04W 76/14; H04W 76/45; H04W 84/18;

(Continued)

(56) References Cited

U.S. PATENT DOCUMENTS 10,536,826 B2 * 1/2020 Lee .................... H04W 72/087
2019/0075548 A1 * 3/2019 Lee .................... H04W 72/044

(Continued)

FOREIGN PATENT DOCUMENTS

CN 106507497 A 3/2017
CN 107615844 A 1/2018

(Continued)

OTHER PUBLICATIONS

"3rd Generation Partnership Project; Technical Specification Group Radio Access Network; Evolved Universal Terrestrial Radio Access (E-UTRA); Services provided by the physical layer (Release 14);" 3GPP TS 36.302 V14.4.0 (Jan. 2017) Technical Specification, pp. 1-30 (Year: 2017).*

(Continued)

*Primary Examiner* — Asad M Nawaz
*Assistant Examiner* — Thomas R Cairns
(74) *Attorney, Agent, or Firm* — Bayes PLLC

(57) ABSTRACT

An apparatus and a method for performing vehicle to everything (V2X) communication are provided. A method for performing the V2X communication of a user equipment includes receiving a network configuration of a plurality of configured grant-free (GF) resources within a network scheduled sidelink resource from a base station, and performing the V2X communication using the configured GF resources.

16 Claims, 3 Drawing Sheets

100
131 F1 F2 132
137 138 Fy Fz
141 F1 144 Fx
110
133 Fy 134 Fz
135 136 F'1 F'2
143 Fx 142 F'1
120
130 140
101 102

Related U.S. Application Data

(60) Provisional application No. 62/629,899, filed on Feb. 13, 2018.

(58) Field of Classification Search
CPC . H04W 4/42–48; H04W 28/12; H04W 72/02; H04W 72/042; H04W 72/0446; H04W 72/0453; H04W 72/1289; H04W 72/1294; H04W 72/14; H04W 92/18; H04W 4/40–48; H04W 72/1263–1273; H04L 65/4061; H04L 5/0012; H04L 5/0033; H04L 5/0064; H04L 5/0092–0098; H04L 5/0091–0098; H04B 1/713
See application file for complete search history.

(56) References Cited

U.S. PATENT DOCUMENTS

| | | | | |
|---|---|---|---|---|
| 2019/0394786 | A1* | 12/2019 | Parron | H04L 27/0006 |
| 2020/0178215 | A1* | 6/2020 | Wang | H04W 72/02 |

FOREIGN PATENT DOCUMENTS

| | | | |
|---|---|---|---|
| EP | 3 657 884 | A1 | 5/2020 |
| WO | 2016165124 | A1 | 10/2016 |
| WO | 2016205988 | A1 | 12/2016 |
| WO | 2016206650 | A1 | 12/2016 |
| WO | 2017011106 | A1 | 1/2017 |
| WO | 2017011942 | A1 | 1/2017 |
| WO | 2017030338 | A1 | 2/2017 |
| WO | 2017135881 | A1 | 8/2017 |
| WO | 2019158054 | A1 | 8/2019 |

OTHER PUBLICATIONS

"3rd Generation Partnership Project; Technical Specification Group Services and System Aspect; Architecture enhancements for V2X services (Release 14)", 3GPP TS 23.285 V14.5.0. (Dec. 2017), Technical Specification, 36 pages.

"Latency reduction for eV2X", Source: OPPO, Agenda Item: 6.2. 3.5, 3GPP TSG RAN WG1 Meeting #92, R1-1802114, Athens, Greece, Feb. 26-Mar. 2, 2018, 3 pages.

"UE autonomous sidelink allocation for NR V2X", Source: Huawei, HiSilicon, Agenda Item 7.2.4.1.4, 3GPP TSG RAN WG1 Meeting #94, R1 1808939, Gothenburg, Sweden, Aug. 20-24, 2018, 5 pages.

Extended European Search Report issued in corresponding European Application No. EP 19 75 4419, dated Dec. 12, 2020, 10 pages.

LG Electronics Inc: "Resource reselection based on latency requirement", Agenda Item: 8.2.2, 3GPP TSG-RAN WG2 #97, R2-1701643, Athens, Greece, Feb. 13-17, 2017, 1 page.

LG Electronics: "Remaining issues on SCI contents", Agenda Item: 7.2.2.5, 3GPP TSG RAN WG1 Meeting #86, R1-166831, Gothenburg, Sweden Aug. 22-26, 2016, 3 pages.

Extended European Search Report issued in corresponding European Application No. EP 19 75 4419, dated Dec. 18, 2020, 10 pages.

The First Office Action issued in corresponding Chinese Application No. 202011078770.X, dated Oct. 9, 2021, 17 pages.

First Office Action issued in corresponding India Application No. 202027035711, dated Sep. 16, 2021, 7 pages.

Communication pursuant to Article 94(3) EPC issued in corresponding European Application No. 19754419.0, dated Sep. 16, 2021, 7 pages.

* cited by examiner

APPARATUS AND METHOD FOR PERFORMING VEHICLE TO EVERYTHING COMMUNICATION

CROSS-REFERENCE TO RELATED APPLICATIONS

The present application is a continuation of International Application No. PCT/CN2019/074869, filed on Feb. 12, 2019, which claims the benefit of priority to U.S. Provisional Application No. 62/629,899, filed on Feb. 13, 2018, both of which are hereby incorporated by reference in their entireties.

BACKGROUND

The present disclosure relates to a field of communication systems, and more particularly, to an apparatus and a method for performing vehicle to everything (V2X) communication.

Latency and reliability play important roles when setting requirements in wireless communication systems. One motivation for reducing latency is to allow faster or almost immediate transmission such as a physical layer (layer 1, L1) transmission upon arrival of packet data transport block (TB) for delay sensitive applications/services with high proximity service (ProSe) per packet priority (PPPP)/priority level (i.e., short-latency requirement). Another motivation is to reduce the latency (time taken) in getting a network (e.g., eNB/gNB) assignment of resources after sending a scheduling request (SR) and a buffer status report (BSR), that is sidelink (SL) user equipment (UE) information.

Current release 14 (Rel-14) long term evolution (LTE)-V2X resource request mechanisms and processes under a network scheduling transmission mode (e.g., mode 3 in LTE-V2X) for L1 transmission upon arrival of a data TB from a higher layer are not fast enough to support future advanced services and use cases with tight latency requirements of less than 20 ms.

One current enhancement method that has been proposed to LTE Release 15 is to additionally send a latency requirement to the eNB along with a current SL-SR and BSR information for a corresponding data message/service, so that the eNB is able to assign Mode 3 (M3) semi-persistent scheduling (SPS) like resources with an appropriate transmission interval to fulfil the latency requirement.

For the above current proposed solution, it can satisfy stringent latency requirements of new future advanced services once the eNB has assigned SPS-like M3 resources. However, upon the arrival of data TB for a first time, a process of sending in uplink (UL) the latency requirement, SL-SR and BSR to the eNB, processing of such request at the eNB and sending the SL-scheduling in the downlink (DL) until a UE can start an L1 transmission over a sidelink would still take quite some time. For new services with latency requirement as short as 5 ms or even 10 ms, it is impossible to fulfill right at the beginning.

There is a need to provide a new technical solution for an apparatus and a method for performing vehicle to everything (V2X) communication to reach low latency and high reliability.

SUMMARY

An object of the present disclosure is to propose a user equipment and a method for controlling transmission of the same in a wireless communication system to reach low latency and high reliability.

In a first aspect of the present disclosure, a user equipment for performing vehicle to everything (V2X) communication includes a memory, a transceiver, and a processor coupled to the memory and the transceiver. The processor is configured to control the transceiver to receive a network configuration of a plurality of configured grant-free (GF) resources within a network scheduled sidelink resource pool from a base station, and the processor is configured to perform the V2X communication using the configured GF resources.

In a second aspect of the present disclosure, a method for performing vehicle to everything (V2X) communication of a user equipment includes receiving a network configuration of a plurality of configured grant-free (GF) resources within a network scheduled sidelink resource pool from a base station and performing the V2X communication using the configured GF resources.

In a third aspect of the present disclosure, a base station for performing vehicle to everything (V2X) communication includes a memory, a transceiver, and a processor coupled to the memory and the transceiver. The processor is configured to configure, to a user equipment, a network scheduled sidelink resource pool, and the processor is configured to configure, to the user equipment, a plurality of configured grant-free (GF) resources within the network scheduled sidelink resource pool.

In a fourth aspect of the present disclosure, a method for performing vehicle to everything (V2X) communication of a base station includes configuring, to a user equipment, a network scheduled sidelink resource pool and configuring, to the user equipment, a plurality of configured grant-free (GF) resources within the network scheduled sidelink resource pool.

In a fifth aspect of the present disclosure, a non-transitory machine-readable storage medium has stored thereon instructions that, when executed by a computer, cause the computer to perform the above method.

In a sixth aspect of the present disclosure, a terminal device includes a processor and a memory configured to store a computer program. The processor is configured to execute the computer program stored in the memory to perform the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
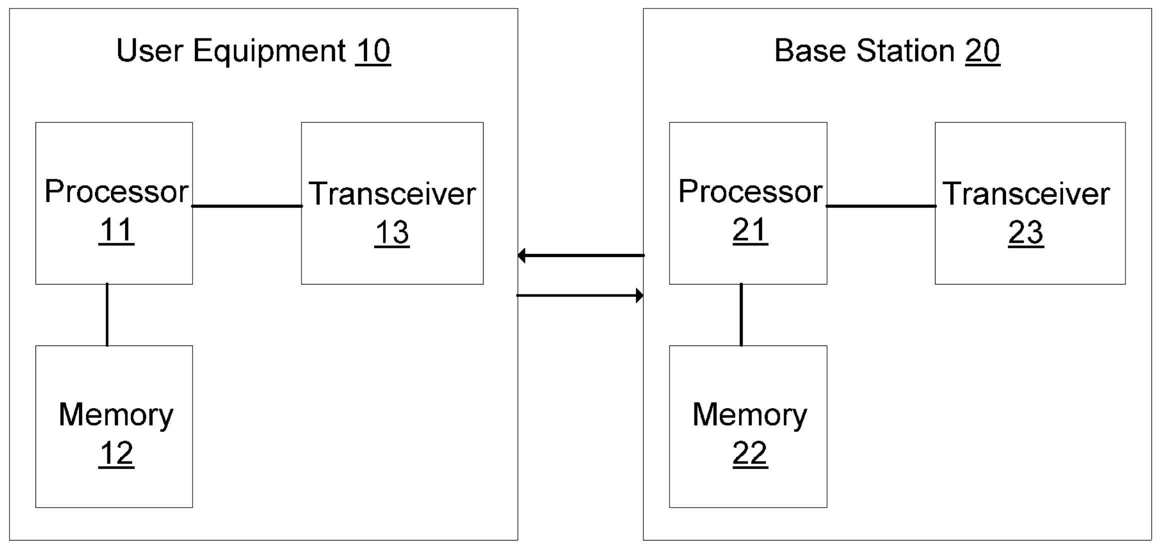
FIG. 1 is a block diagram of a user equipment and a base station performing vehicle to everything (V2X) communication according to an embodiment of the present disclosure.

FIG. 1 illustrates that, in some embodiments, a user equipment (UE) 10 and a base station 20 performing vehicle to everything (V2X) communication according to an embodiment of the present disclosure are provided. The UE 10 may include a processor 11, a memory 12, and a transceiver 13. The base station 20 may include a processor 21, a memory 22, and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random-access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, and beyond. UEs communicate with each other directly via a sidelink interface, such as a PC5 interface.

In some embodiments, the processor 11 is configured to control the transceiver 13 to receive a network configuration of a plurality of configured grant-free (GF) resources within a network scheduled sidelink resource pool from the base station 20, and the processor 11 is configured to perform the V2X communication using the configured GF resources.

In some embodiments, the processor 21 is configured to configure, to the user equipment 10, a network scheduled sidelink resource pool and the processor 21 is configured to configure, to the user equipment 10, a plurality of configured grant-free (GF) resources within the network scheduled sidelink resource pool.

Figure 2:
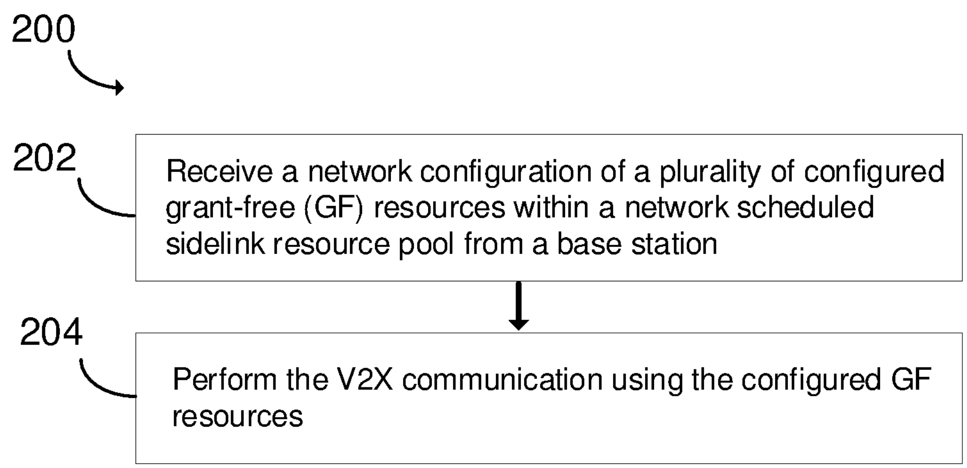
FIG. 2 is a flowchart illustrating a method for performing vehicle to everything (V2X) communication of a user equipment according to an embodiment of the present disclosure.

FIG. 2 illustrates a method 200 for performing vehicle to everything (V2X) communication of the user equipment 10 according to an embodiment of the present disclosure. The method 200 includes: at block 202, receiving a network configuration of a plurality of configured grant-free (GF) resources within a network scheduled sidelink resource pool from the base station 20, and at block 204, performing the V2X communication using the configured GF resources.

Figure 3:
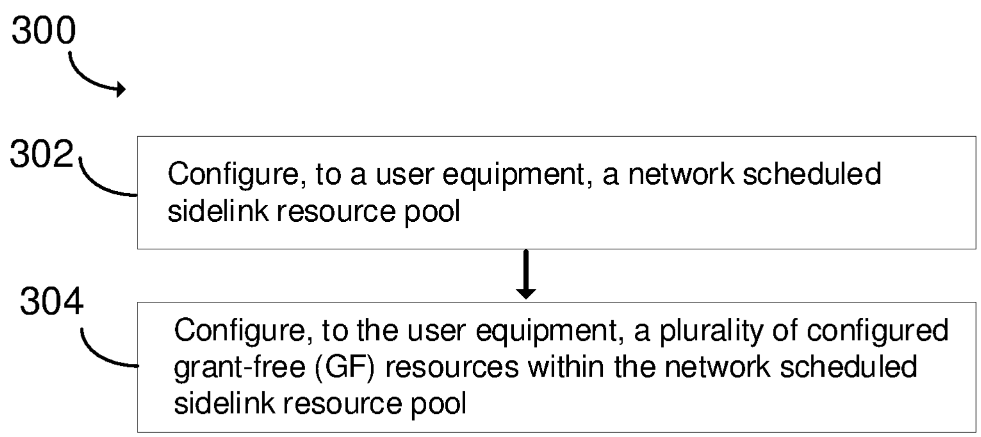
FIG. 3 is a flowchart illustrating a method for performing vehicle to everything (V2X) communication of a base station according to an embodiment of the present disclosure.

FIG. 3 illustrates a method 300 for performing vehicle to everything (V2X) communication of the base station 20 according to an embodiment of the present disclosure. The method 300 includes: at block 302, configuring, to the user equipment 10, a network scheduled sidelink resource pool, and at block 304, configuring, to the user equipment 10, a plurality of configured grant-free (GF) resources within the network scheduled sidelink resource pool.

In some embodiments, the network scheduled sidelink resource pool includes a plurality of sidelink GF sub-channels in a frequency domain and a time domain, and the sidelink GF sub-channels are configured in an upper frequency portion and a lower frequency portion of the network scheduled sidelink resource pool. In details, a number of the sidelink GF sub-channels per subframe in the upper frequency portion is same as a number of the sidelink GF sub-channels per subframe in the lower frequency portion.

In some embodiments, the processor 11 is configured to constantly monitor and listen to a plurality of sidelink data messages transmitted on the configured GF resources, such that the processor 11 identifies available configured GF resources of the configured GF resources after the processor 11 constantly monitors and listens to the sidelink data messages transmitted on the configured GF resources.

In some embodiments, the processor 11 is configured to determine an availability of the configured GF resources by reading a resource reservation, a time location field, and a frequency location field in a physical sidelink control channel (PSCCH) transmitted from another user equipment.

In some embodiments, upon the arrival of a sidelink data packet from an upper layer of the user equipment 10 for transmission, the transceiver 13 performs a sidelink transmission of a data transport block (TB) using the configured GF resources within a latency time period requirement which is according to a ProSe (proximity service) per packet priority (PPPP) level of the sidelink data packet. In detail, the sidelink transmission of the data TB using the configured GF resources includes an initial transmission and a re-transmission of the same data TB. The initial transmission and the re-transmission of the same data TB are in different subframes of the network scheduled sidelink resource pool.

In some embodiments, the re-transmission of the same data TB is frequency hopping transmitted in a different frequency portion of the network scheduled sidelink resource pool than the initial transmission.

In some embodiments, the same sidelink GF sub-channel index in an upper frequency portion of the network scheduled sidelink resource pool is repeated in the same order in a lower frequency portion of the network scheduled sidelink resource pool.

In some embodiments, the same sidelink GF sub-channel index in a lower frequency portion of the network scheduled sidelink resource pool is repeated in the same order in an upper frequency portion of the network scheduled sidelink resource pool.

In addition, each frequency hopping pair is a pair of the sidelink GF sub-channels for transmitting the initial transmission and re-transmission of the same data TB.

In some embodiments, when the processor 11 identifies the available configured GF resources of the configured GF resources, the processor 11 selects an available sidelink GF sub-channel for an initial transmission within a latency time period of the data TB randomly or according to an identity of the user equipment and a total number of sidelink GF sub-channels in the frequency domain. The processor 11 selects a next available sidelink GF sub-channel for a re-transmission of the same data TB within the latency time period and according to a frequency hopping rule.

In some embodiments, the processor 11 is configured to perform the V2X communication using the configured GF resources according to a plurality of sidelink control information (SCI) parameters in a physical sidelink control channel (PSCCH). In details, the SCI parameters include a resource reservation field, a priority field, a time gap, and/or a frequency resource location, the resource reservation field is set according to a number of data TB transmissions within a predetermined period, the priority field is set according to a latency requirement associated to a PPPP level of a data TB, the time gap is according to a resource availability within a sidelink transmission of the data TB, and/or the frequency resource location is according to a frequency hopping rule.

Figure 4:
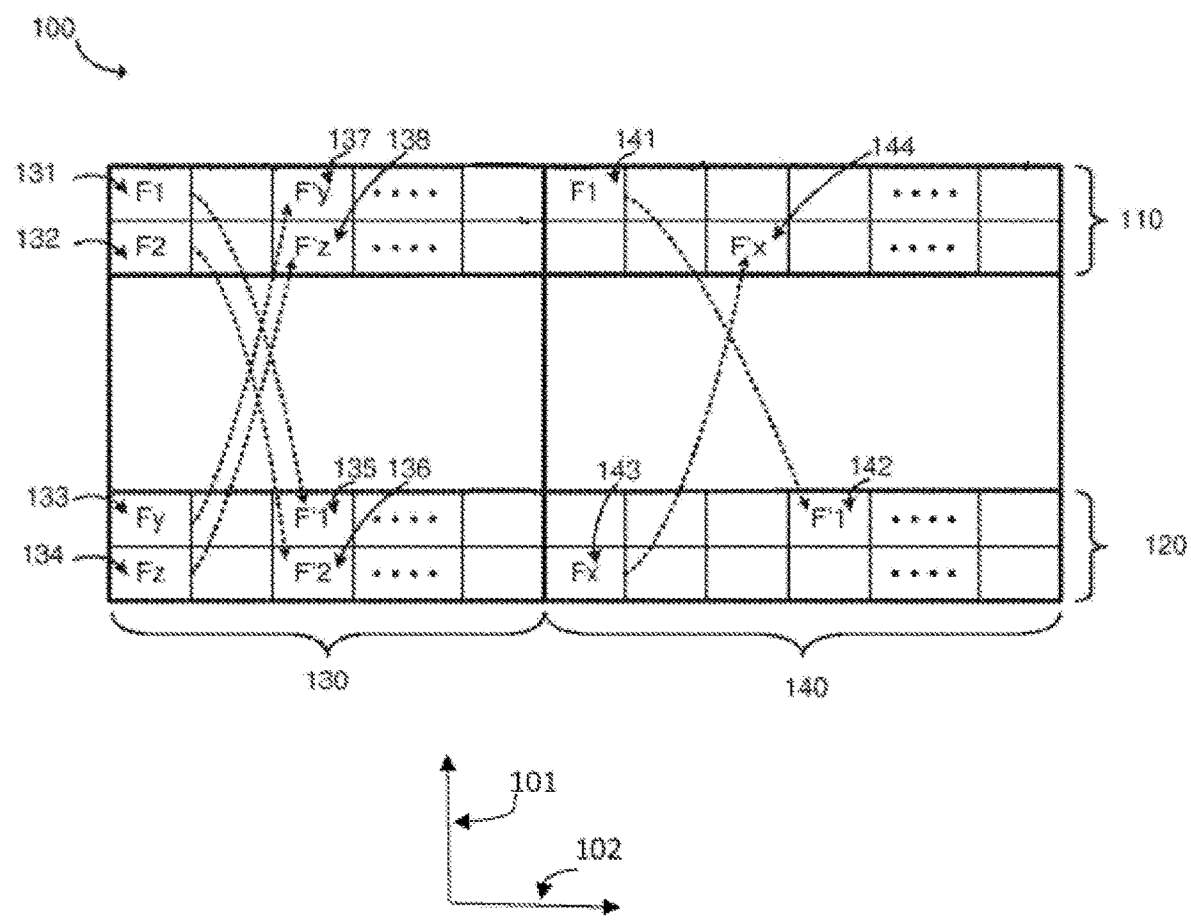
FIG. 4 is a schematic diagram illustrating a structure of a configured grant-free (GF) resources/sub-pool in an upper and lower frequency portions of a network scheduled sidelink resource pool according to an embodiment of the present disclosure.

FIG. 4 illustrates a schematic diagram illustrating a structure of a configured grant-free (GF) resources/sub-pool in an upper and lower frequency portions of a network scheduled sidelink resource pool according to an embodiment of the present disclosure. FIGS. 1 and 4 illustrate that, in some embodiments, in a network scheduling transmission mode (e.g., Mode 3 in LTE), the network configures grant-free (GF) resources or a sub-pool of grant-free resources that are in at least one network scheduled resource pool (e.g., Mode 3 resource pool in LTE) 100 for urgent/immediate sidelink (SL) data TB transmissions for the UE 10 such as Mode 3 (M3) UEs while the UE 10 requesting and waiting for SL grant from the base station 20, such as an eNB. In detail, upon arrival of SL data TB with latency requirement of less than or equal to 20 ms, M3 UEs are allowed to use these GF resources for temporary transmission until receiving an SL grant from the eNB.

In reference to FIG. 4, GF resources/sub-pool includes multiple sidelink sub-channels in a frequency domain 101 and in a time domain 102. A number of GF sub-channels per subframe in an upper frequency portion 110 is the same as a number of GF sub-channels in a lower frequency portion 120, to allow symmetrical resources for frequency hopping transmissions.

In some embodiments, GF sub-channels are further indexed as F1, F2, . . . , Fy, Fz, as illustrated by 131, 132, 133, and 134 in the frequency domain, respectively.

Frequency hopping pattern/rule of the embodiment is as follows.

1. Sidelink transmission of a data TB using GF resources/sub-pool includes at least an initial transmission and one re-transmission of the same data TB.

2. Transmissions of the initial-transmission and re-transmission of the same data TB are in different subframe.

3. At least one re-transmission of the same data TB is frequency hopping transmitted in a different frequency portion of the Mode 3 resource pool than the initial transmission.

4. The same GF sub-channel index in an upper frequency portion F1 131 or F2 132 is repeated in the same order in a lower frequency portion F'1 135 or F'2 136. In addition, each frequency hopping pair F1/F'1 or F2/F'2 is a pair of GF sub-channels for transmitting the initial-transmission and re-transmission of the same data TB.

5. Similarly, the same GF sub-channel index in a lower frequency portion Fy 133 or Fz 134 is repeated in the same order in an upper frequency portion F'y 137 or F'z 138. In addition, each frequency hopping pair Fy/F'y or Fz/F'z is a pair of GF sub-channels for transmitting the initial-transmission and re-transmission of the same data TB.

In some embodiments, a method for resource selection and data TB transmissions using the GF resource sub-pool includes the following steps.

Step 1, monitoring and listening period 130 (such as 20-100 ms): A Mode 3 UE constantly monitors and listens to SL data messages transmitted on GF sub-pool resources. The Mode 3 UE determines the utilization of GF sub-pool resources and their future availability by reading a resource reservation and time and frequency locations fields in PSCCH transmitted from other UEs.

Step 2, determining transmission (Tx) period 140: Upon the arrival of SL data packet from UE's own upper layer for transmission, the UE determines based on latency requirement/PPPP level of the data packet a maximum Tx period (e.g., M ms) within which the UE completes its L1 transmission of the data packet TB (including both initial-transmission and re-transmission).

Step 3, GF sub-channel/resource-pair selection: Based on identified available GF resources from Step 1, the UE selects an available/empty (e.g., earliest) GF sub-channel (Fx) within a derived Tx period randomly or according to UE's ID (e.g., C-RNTI, SL-V-RNTI or SL-SPS-V-RNTI) and the total number of GF sub-channels in the frequency domain. Fx=Mod {UE_ID, No. of GF frequency sub-channels per subframe} Based on the frequency hopping pattern/rule described previously, the UE selects a next available GF sub-channel for re-transmission of the same data TB within the Tx period.

In one example, a Mode 3 UE selects a GF resource F1 141 for its initial-transmission of a data TB. According to the frequency hopping pattern/rule and based on the availability of GF resources within a Tx period, the UE selects another GF resource F'1 142 for re-transmission of the same data TB.

In another example, a Mode 3 UE selects a GF resource Fx 143 for its initial-transmission of a data TB. According to the frequency hopping pattern/rule and based on the availability of GF resources within a Tx period, the UE selects another GF resource F'x 144 for re-transmission of the same data TB.

Step 4, setting SCI parameters in PSCCH: Resource reservation field is set according to a number of data TB transmission needed within 20 ms. The priority field is set according to the latency requirement associated with data TB's PPPP level. The time gap is according to per resource availability within the Tx period. Frequency resource location is according to per frequency hopping rule.

In the embodiment, it is proposed to introduce Grant-Free (GF)/configured grant resources/or sub-pool within a network scheduled sidelink resource pool (e.g., a Mode 3 resource pool in LTE-V2X) to allow sidelink UEs to perform immediate and temporally L1 transmissions upon arrival of urgent packet data TB from the upper layers while waiting for network scheduling of grant-based (GB) resources for sidelink transmissions.

The embodiment includes at least one of the following advantages.

1. Multiple sub-channels in the frequency domain of a GF resource sub-pool increases the selection/distribution of resources among Mode 3 UEs that need to perform urgent ultra-reliable low-latency communication (URLLC) transmissions. This minimizes transmission collisions.

2. Monitoring and listening of GF resource utilization, and determination of transmission subframes/time instances is based on individual data latency requirement (PPPP level), and resource availability will further reduce Tx collision among Mode 3 UEs.

3. Frequency hopping provides diversity gain in the frequency domain for more reliable data delivery over sidelink.

Figure 5:
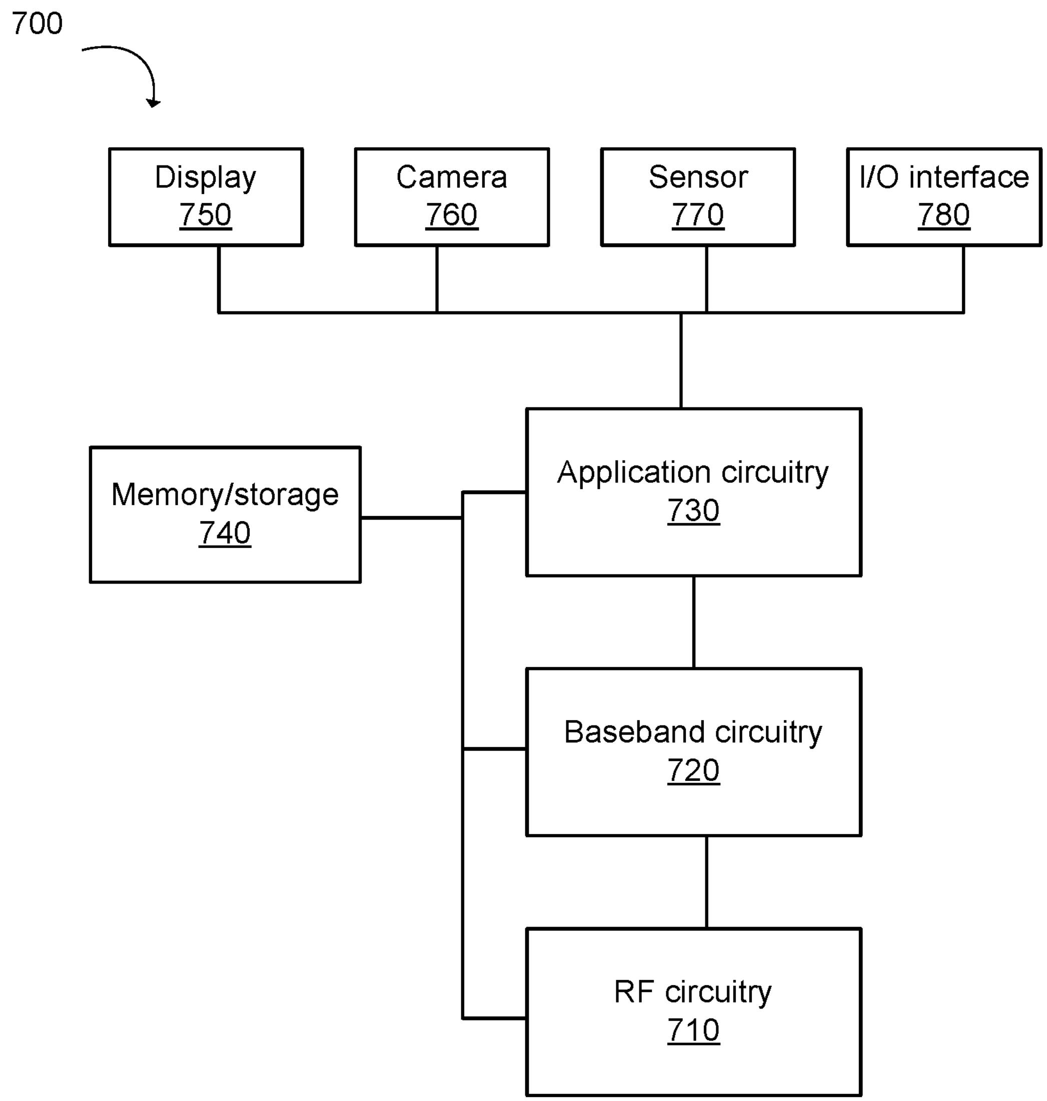
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random-access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, methods described herein may be implemented as a computer program. The computer program may be stored on a storage medium, such as a non-transitory storage medium.

In the embodiment of the present disclosure, an apparatus and a method for performing vehicle to everything (V2X) communication to reach low latency and high reliability are provided. The embodiment of the present disclosure is a combination of techniques/processes that can be adopted in 3GPP specifications to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application, while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized in other ways. The above-mentioned embodiments are exemplary only. The division of the units is merely based on logical functions, while other divisions exist in realization. It is possible that a plurality of units or components are combined or integrated with another system. It is also possible that some characteristics are omitted or skipped. On the other hand, the displayed or discussed mutual coupling, direct coupling, or communicative coupling operate through some ports, devices, or units, whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated into one processing unit, physically independent, or integrated into one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random-access memory (RAM), a floppy disk, or other kinds of media capable of storing program codes.

It is understood that the present disclosure is not limited to the disclosed embodiments but is intended to cover various arrangements made without departing from the scope of the broadest interpretation of the appended claims.

What is claimed is:

1. A user equipment for performing vehicle to everything (V2X) communication, comprising:

a memory;

a transceiver; and a processor coupled to the memory and the transceiver, wherein the processor is configured to:

control the transceiver to receive a network configuration of a plurality of configured grant-free resources within a network scheduled sidelink resource from a base station; and after receiving the configuration, upon an arrival of a sidelink data packet from an upper layer of the user equipment for transmission, perform the V2X communication using the received configured grant-free resources;

wherein upon the arrival of the sidelink data packet from the upper layer of the user equipment for transmission, the transceiver performs a sidelink transmission of a data transport block (TB) using the configured grant-free resources within a latency time period requirement which is according to a proximity service (ProSe) per packet priority (PPPP) level of the sidelink data packet.

2. The user equipment of claim 1, wherein the sidelink transmission of the data TB using the configured grant-free resources comprises an initial transmission and a re-transmission of a same data TB.

3. The user equipment of claim 2, wherein the initial transmission and the re-transmission of the same data TB are in different subframes of the network scheduled sidelink resource.

4. The user equipment of claim 1, wherein the processor is configured to perform the V2X communication using the configured grant-free resources according to a plurality of sidelink control information (SCI) parameters in a physical sidelink control channel (PSCCH).

5. The user equipment of claim 4, wherein the SCI parameters comprises at least one of a resource reservation field, a priority field, a time gap, or a frequency resource location.

6. The user equipment of claim 5, wherein the resource reservation field is set according to a number of data TB transmissions within a predetermined period.

7. The user equipment of claim 5, wherein the priority field is set based on a PPPP level associated with a latency requirement of a data TB.

8. The user equipment of claim 5, wherein the time gap is according to a resource availability within a sidelink transmission of the data TB, and the frequency resource location is according to a frequency hopping rule.

9. A method for performing vehicle to everything (V2X) communication of a user equipment, comprising:

receiving a network configuration of a plurality of configured grant-free resources within a network scheduled sidelink resource from a base station; and after receiving the configuration, upon an arrival of a sidelink data packet from an upper layer of the user equipment for transmission, performing the V2X communication using the received configured grant-free resources;

wherein upon the arrival of the sidelink data packet from the upper layer of the user equipment for transmission, the method comprises performing a sidelink transmission of a data transport block (TB) using the configured grant-free resources within a latency time period requirement which is according to a proximity service (ProSe) per packet priority (PPPP) level of the sidelink data packet.

10. The method of claim 9, wherein the sidelink transmission of the data TB using the configured grant-free resources comprises an initial transmission and a re-transmission of a same data TB.

11. The method of claim 10, wherein the initial transmission and the re-transmission of the same data TB are in different subframes of the network scheduled sidelink resource.

12. The method of claim 9, further comprising performing the V2X communication using the configured grant-free resources according to a plurality of sidelink control information (SCI) parameters in a physical sidelink control channel (PSCCH).

13. The method of claim 12, wherein the SCI parameters comprise at least one of a resource reservation field, a priority field, a time gap, or a frequency resource location.

14. The method of claim 13, wherein the resource reservation field is set according to a number of data TB transmissions within a predetermined period.

15. The method of claim 13, wherein the priority field is set based on a PPPP level associated with a latency requirement of a data TB.

16. The method of claim 13, wherein the time gap is according to a resource availability within a sidelink transmission of the data TB, and the frequency resource location is according to a frequency hopping rule.

* * * * *